# United States Patent [19]

Sakurada et al.

[11] 4,134,660
[45] Jan. 16, 1979

[54] SELF TIMER OF CAMERA

[75] Inventors: Nobuaki Sakurada; Tadashi Ito, both of Yokohama; Hiroyasu Murakami, Tokyo; Masayoshi Yamamichi; Masayuki Suzuki, both of Kawasaki; Nobuhiko Shinoda, Tokyo, all of Japan

[73] Assignee: Canon Kabushiki Kaisha, Tokyo, Japan

[21] Appl. No.: 811,205

[22] Filed: Jun. 29, 1977

[30] Foreign Application Priority Data

Jul. 7, 1976 [JP] Japan .................................. 51-80541
Sep. 9, 1976 [JP] Japan ................................ 51-108303

[51] Int. Cl.² .......................... G03B 17/18; G08B 5/38
[52] U.S. Cl. .................................... 354/289; 354/238; 340/309.1
[58] Field of Search ................... 354/23 D, 60 L, 238, 354/239, 289; 340/168 B, 309.1, 378 R, 384 E, 221; 328/38, 46, 72; 58/145 R, 57.5, 152 R

[56] References Cited

U.S. PATENT DOCUMENTS

| 3,223,013 | 12/1965 | Rentschler | 354/239 |
| 3,726,200 | 4/1973 | Ogiso et al. | 354/51 |
| 4,038,675 | 7/1977 | Kitai et al. | 354/238 |

FOREIGN PATENT DOCUMENTS 1213320  11/1970  United Kingdom .................... 354/238

Primary Examiner—L. T. Hix
Assistant Examiner—William B. Perkey
Attorney, Agent, or Firm—Toren, McGeady and Stanger

[57] ABSTRACT

A self timer of a camera in particular a self timer for digitally controlling self timing has an indicating element responsive to pulses from a standard pulse generator to be energized intermittently and a control means for varying the period of energization and deenergization of the indicating element after a predetermined time interval. Thus, it being made possible for the photographer to know the expiration time of the self timer.

18 Claims, 7 Drawing Figures

SELF TIMER OF CAMERA

BACKGROUND OF THE INVENTION

1. Field of the Invention

This invention relates to a self timer of camera capable of indicating the self timing operation, and more particularly, to a self timer constructed so as to indicate the self timing operation by lighting on and off an indicating element such as a LED or lamp.

2. Description of the Prior Art

The mechanical self timers using gear governors have found wide use in photographic camera. A setting member for the mechanical self timer serves also as an indicator which is moved from the set position to the initial position during the self timing operation, thereby the photographer is informed of how much time is left until timing operation is over. It is known to provide an electronic self timer in the form of a CR time constant circuit, or with inclusion of a frequency divider. In this case, however, it has heretofore been impossible to provide an indicator which enables the photographer to be informed of how much the self timer has advanced in time.

OBJECTS OF THE INVENTION

An object of the present invention is to provide an electronic self timer which enables the operator to be informed of the timing duration.

Another object is to provide a self timer which is feasible for construction by using integrated circuits.

Other objects of the invention will become apparent from the following description of embodiments of the invention taken in conjunction with the accompanying drawings.

SUMMARY OF THE PRESENT INVENTION

In accordance with the present invention, an electrical self-timer for a camera comprises a single indicator which indicates duration of a self-timing operation of the self-timer and pulse forming means for generating a pulse train having a first frequency, the pulse forming means being operatively connected to the single indicator to energize the indicator at a frequency responsive to the pulse train and in synergism with the start of the self-timing operation. Also included are means connected to the pulse train forming means for changing the frequency of said pulse train from the first frequency to a second frequency, which is different from the first frequency when the self-timing operation proceeds halfway.

DESCRIPTION OF THE PREFERRED EMBODIMENTS

Figure 1:
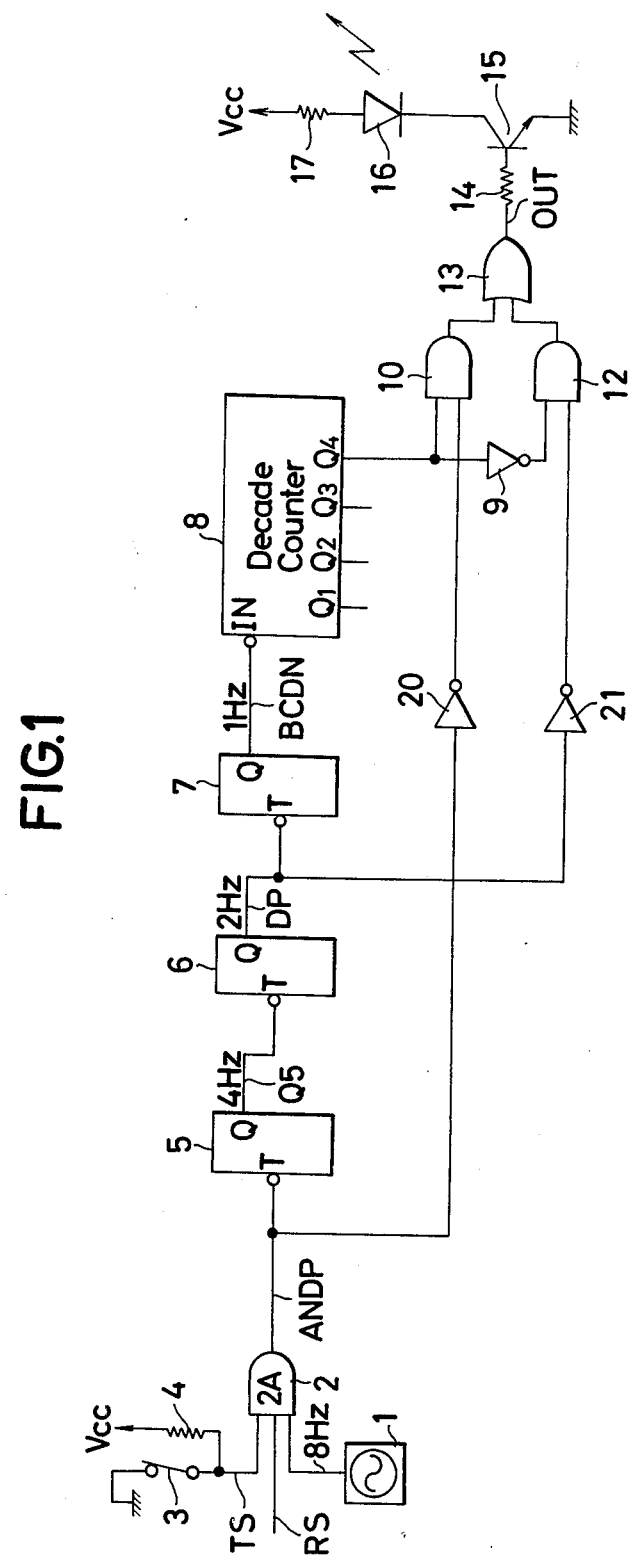
FIG. 1 is a schematic circuit diagram of one embodiment of a self timer according to the present invention.

Referring to FIGS. 1 to 4, there is shown one embodiment of a self timer according to the present invention adapted for use with a photographic camera. As shown in FIG. 1, the self timer which is in a position before operation includes a standard pulse generator 1 of construction known in the art, the pulse frequency of said generator 1 being set to 8 Hz, an AND circuit 2 having three input terminals: one is connected to the output terminal of the generator 1, the second is connected to the output terminal of a release signal generator of a camera shown in FIG. 3, and the third is grounded through a normally close type switch, a self timer start switch 3, a resistor 4 connected between an electrical power source (hereinafter referred to as Vcc) and the third input terminal of the AND circuit 2, a first T type flip-flop circuit 5 having an input terminal T connected to the output terminal of the AND circuit 2, a second T type flip-flop 6 circuit having an input terminal T connected to an output terminal Q of the first flip-flop circuit 5, a third T type flip-flop circuit 7 having an input terminal T connected to an output terminal Q of the second flip-flop circuit 6, these three flip-flop circuits 5, 6 and 7 constituting a frequency dividing circuit, a 4-bit binary coded decimal counter BCD having four output stages Q1, Q2, Q3 and Q4 and having an input terminal IN connected to an output terminal Q of the third flip-flop circuit 7, an AND circuit 10 having two input terminals one of which is connected to the most significant bit or output stage Q4 of the counter BCD and the other of which is connected through an inverter 20 to the output terminal of the AND circuit 2, an AND circuit 12 having two input terminals one of which is connected through an inverter 9 to the most significant bit Q4 of the counter BCD and the other of which is connected through an inverter 21 to the output terminal Q of the second flip-flop circuit 6, an OR circuit 13 having two input terminals connected to the respective output terminals of the AND circuits 10 and 12, and an npn transistor 15 having a base electrode connected through a resistor 14 to the output terminal of the OR circuit 13, having an emitter electrode grounded and having a collector electrode connected through a light emitting diode 16 and a resistor 17 to the power source Vcc. This light emitting diode 16 functions as an indicating element which is lighted on and off in sequence when the self-timer is in operation. The resistor 17 is provided to limit the current flowing through the light emitting diode 16. The parts 8 to 13, 20 and 21 constitute gate means.

Figure 3:
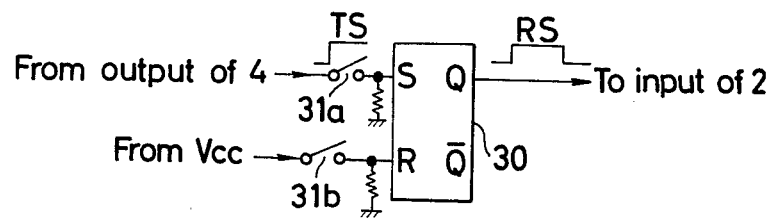
FIG. 3 is a circuit diagram of a practical example of the release signal generator of FIG. 1.

In FIG. 3, the above mentioned release signal generator comprises an R-S flip-flop circuit 30 having a set input terminal S connected to a point on connection between the resistor 4 and the switch 3 through a normally open type switch 31a and having a reset input terminal R connected to a normally open type switch 31b which is to be closed when a leading curtain of shutter starts to run down and having an output terminal Q connected to the second input terminal of the AND circuit 2.

Figure 4:
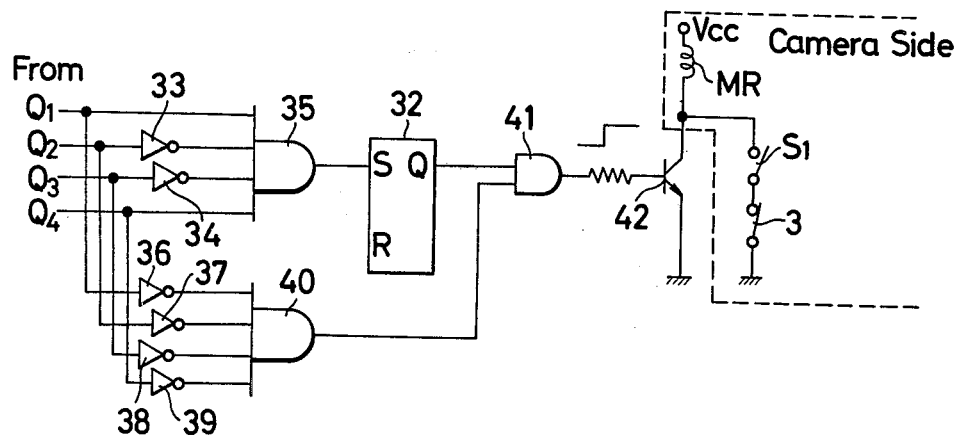
FIG. 4 is a circuit diagram of an example of a camera control circuit usable with the circuit of FIG. 1.

In FIG. 4, a practical example of a control circuit for causing the camera to start in synchronism with the timingup of the self timer comprises an R-S flip-flop circuit 32, an AND circuit 35 having four input terminals: the first is connected to the output terminal Q1 of the counter 8, the second is connected through an inverter 33 to the output terminal Q2 of the counter 8, the third is connected through an inverter 34 to the output terminal Q3 of the counter 8, and the fourth is connected to the output terminal Q4 of the counter 8, and having an output terminal connected to a set input terminal of the flip-flop circuit 32, an AND gate 40 having four input terminals connected through respective inverters 36, 37, 38 and 39 to the respective output terminals Q1, Q2, Q3 and Q4 of the counter 8, an AND gate 41 having two input terminals connected to the respective output terminals of the flip-flop circuit 32 and the AND circuit 40, and an npn transistor 42 having a base electrode connected through a resistor to the output terminal of the AND circuit 41 and having an emitter electrode grounded. When the self timer is timed up, a voltage of high level appears at the output terminal of the AND circuit 41. Further when this self timer is applied to a camera of the type shown, for example, in Japanese Laid-Open Patent application No. Sho 51-41524 issued Apr. 7, 1976, the collector electrode of the transistor 42 is connected to the solenoid of an electromagnet MR, and further the switch 3 is connected in series with a switch S1 which is arranged to cooperate with a release trigger.

The operation of the self timer of FIG. 1 will next be explained in connection with FIG. 2 wherein various waveforms of the components of the self timer are shown with waveform RS appearing at the output terminal of the release signal generator of FIG. 3, the waveform TS at the input terminal 2A of the AND circuit 2, the waveform ANDP at the output terminal of the AND circuit 2, the waveform Q5 at the output terminal of the first flip-flop circuit 5, the waveform DP at the output terminal of the second flip-flop circuit 6, the waveform BCDN at the input terminal of the counter 8, the waveforms Q1, Q2, Q3 and Q4 at the respective output stages of the counter 8, and the waveform OUT at the output terminal of the OR circuit 13.

Figure 2:
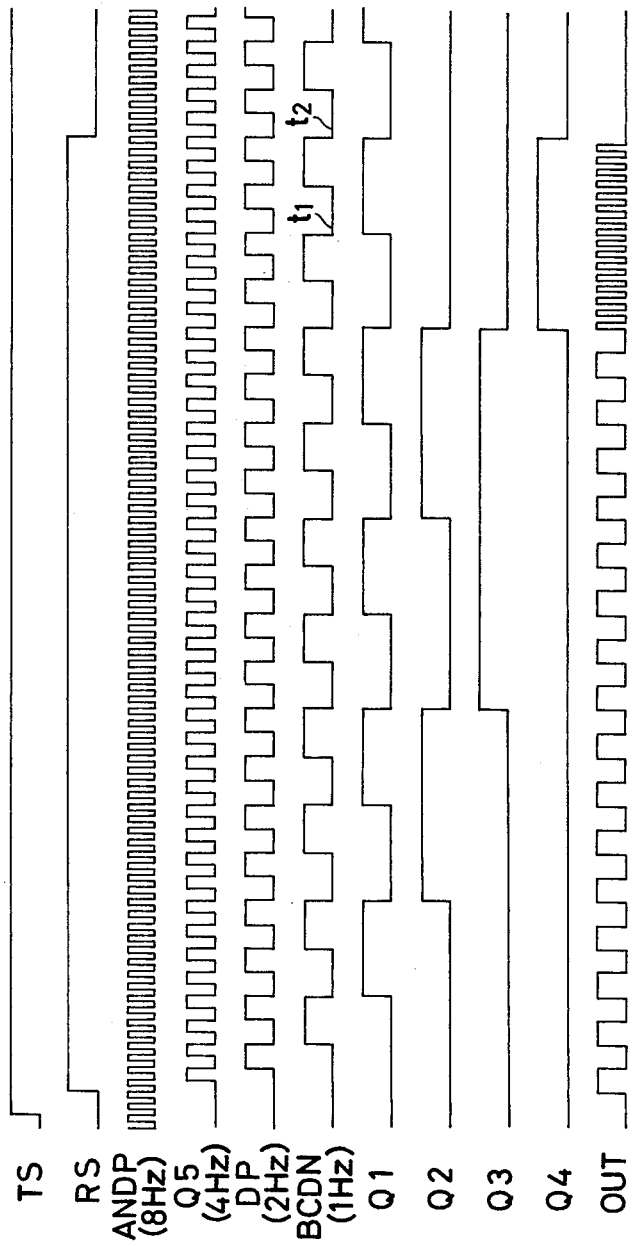
FIG. 2 is a pulse timing chart showing the manner in which the self timer of FIG. 1 may be used.

When an exposure is to be made with the help of the self timer, the photographer will at first manipulate a (not shown) switch to open the switch 3 of FIG. 1, thereby the potential at the input terminal 2A of the AND circuit 2 is changed from the binary "0" to "1" level as shown on line TS in FIG. 2. Upon depression of a shutter release button (not shown), the switch 31a of FIG. 3 is closed to apply the high level signal TS to the set input terminal S of the flip-flop circuit 30 with the resulting output therefrom becoming "1" as shown on line RS. As the two input terminals of the AND circuit 2 take simultaneously the binary "1" condition, the AND circuit 2 is gated on to pass the pulses of 8 Hz from the generator 1 to the frequency divider 5, 6, 7. The frequency of the pulses ANDP from the AND circuit 2 is divided by a factor of 2 in passing through each of the cascade-connected flip-flop circuits 5, 6 and 7. The second flip-flop circuit 6 initially produces an output of "0" on line DP which after inverted by the inverter 21 to "1" is applied to the AND circuit 12. On the other hand, at this time, because of the "0" condition of the output stage Q4 of the BCD counter 8 as shown on line Q4 in FIG. 2, the other or gating control input terminal of the AND circuit 12 has a potential of "1" so that the pulse of 2 Hz as shown on line DP in FIG. 2 are allowed to pass through the AND circuit 12 and then through the OR circuit 13 and the resistor 14 to the transistor 15, thereby the light emitting diode 16 is intermittently energized and deenergized at a frequency of 2 Hz with the driving current supply from Vcc, indicating that the self timer is in operation, provided that the light emitting diode 16 is positioned to be viewed by persons to be photographed and the photographer. As the counter 8 receives the pulses of 1 Hz from the frequency divider 5, 6, 7, when the number of pulses counted by the counter 8 has reached eight in eight seconds, the most significant bit output stage Q4 of the binary counter 8 takes the "1" condition. This condition is held for 2 seconds.

When the output stage Q4 of the counter 8 is changed to "1" condition as shown above, the AND circuit 12 is gated off to terminate the application of the pulses DP from the second flip-flop circuit 6 to the transistor 15, but instead the other AND circuit 10 is gated on to pass the pulses ANDP from the AND circuit 2 to the transistor 15, thereby the light emitting diode 16 is energized and deenergized at a frequency of 8 Hz for a subsequent time interval of 2 seconds. By the change in the frequency from 2 Hz to 8 Hz, the lighting condition of the light emitting diode 16 is changed, indicating that the duration of the self timing operation approaches termination. In 2 seconds from the time at which the light emitting diode 16 changes its frequency of energization to 8 Hz, the potential at the output stage Q4 of the counter 8 is again changed to "0", thereby the AND circuit 2 is cut from connection with the transistor 15 at the AND circuit 10.

At a time $t_1$ (see FIG. 2), the output terminal of the AND circuit 35 in the control circuit of FIG. 4 takes "1" condition, causing the flip-flop circuit 32 to produce an output of "1" which is applied to one of the two input terminals of the AND circuit 41. On the other hand, at a time $t_2$, that is, when the self timer has concluded its operation, the output of the AND circuit 40 is changed to "1", so that the AND circuit 41 produces an output of "1" at the time $t_2$.

Therefore, in the case where this self timer is associated with the camera shown and described in Japanese Laid-Open Patent application No. Sho 51-41524, when the self timer has concluded its operation, the electromagnet MR is energized by the output of the AND circuit 41, thus the exposure control operation of the camera starts to make the exposure. As the leading curtain of the camera shutter runs down to the exposure aperture open position, the switch 31b of FIG. 3 is closed so that the reset input terminal R of the flip-flop circuit 30 takes a high level signal. On the other hand, at this time, as the release button has already released from the depression to open the switch 31a, the flip-flop circuit 30 is reset to produce an output of "0". Thus the output signal RS of the release signal generator becomes again "0" as shown in FIG. 2. The AND circuit 12 permits no signal to be passed therethrough. It is to be noted here that the time interval between the time at which the camera starts by the output signal of the AND circuit 41 and the time at which the leading curtain starts to run down with simultaneous occurrence of closure of the switch 31b is about 50 milliseconds, and therefore that the output signal RS of the release signal generator becomes again "0" in a time interval of about 50 milliseconds after the self timer has concluded its operation. Therefore, after the conclusion of operation of the self timer, the transistor 15 is maintained in the non-conducting state, and the light emitting diode 16 is completely turned off, thereby the persons to be photographed are informed of the fact that the self timing operation has been completed.

In the embodiment described above, the last 2 seconds is indicated by the lighting on and off at a frequency of 8 Hz. Instead of connecting the input terminal of the inverter 20 to the output terminal of the AND circuit as shown in FIG. 1, but to the output terminal of the first flip-flop circuit 5 as shown in FIG. 5, the last 2 seconds may be indicated by the lighting on and off at a frequency of 4 Hz to afford a similar aim to that described in connection with the embodiment of FIGS. 1 to 4.

Figure 5:
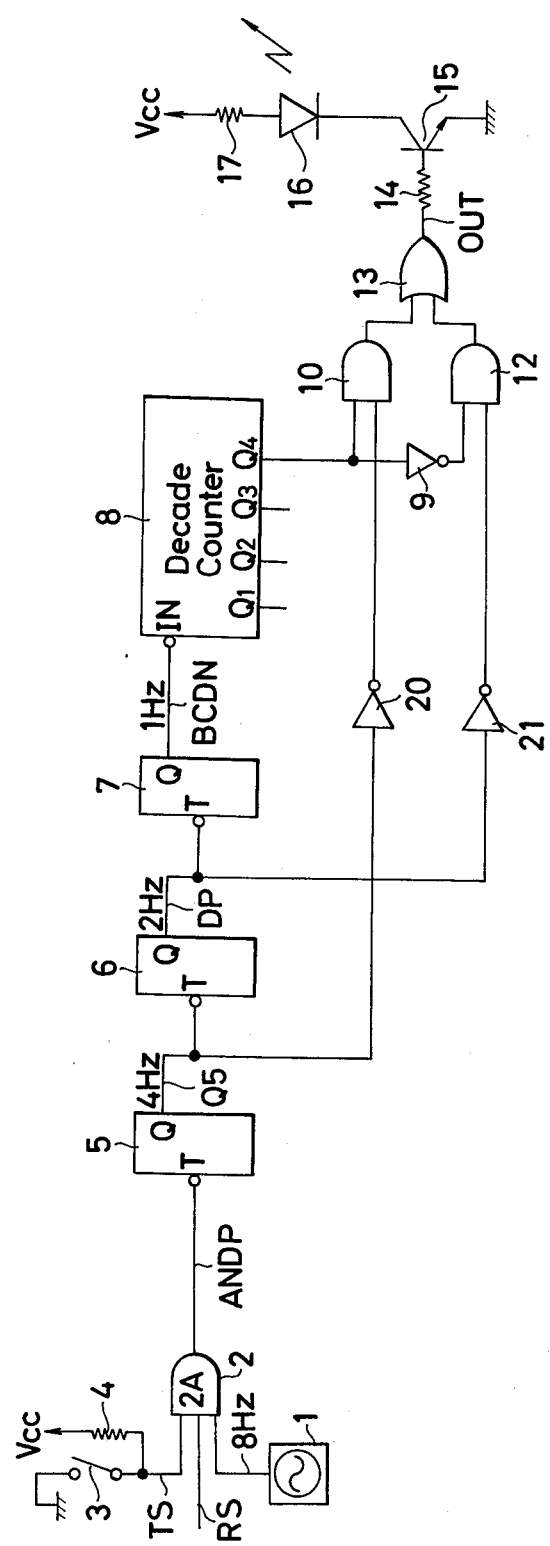
FIG. 5 is a schematic circuit diagram of another embodiment of the invention.

The second embodiment of FIG. 5 is so similar to the embodiment of FIG. 1 that the same reference characters have been employed to denote the similar parts to those of FIG. 1, and that the explanation of the construction and arrangement of the various parts is omitted.

Figure 6:
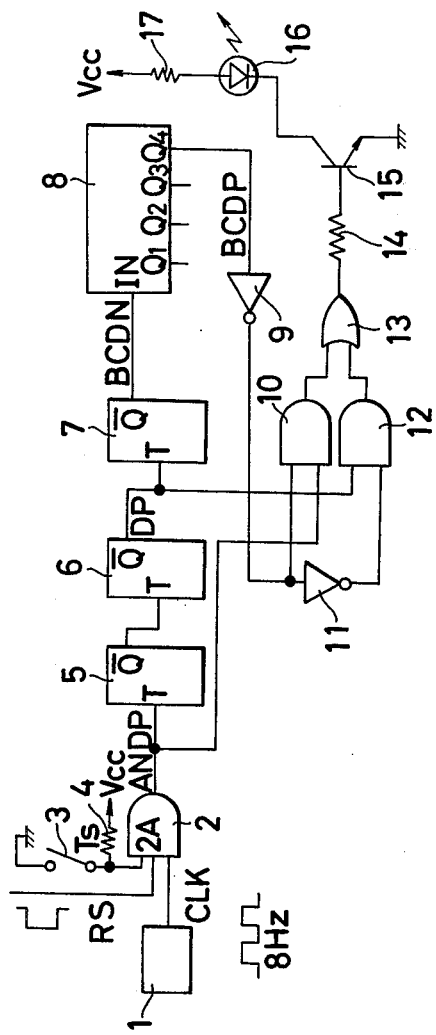
FIG. 6 is a schematic circuit diagram of a still another embodiment of the invention.
Figure 7:
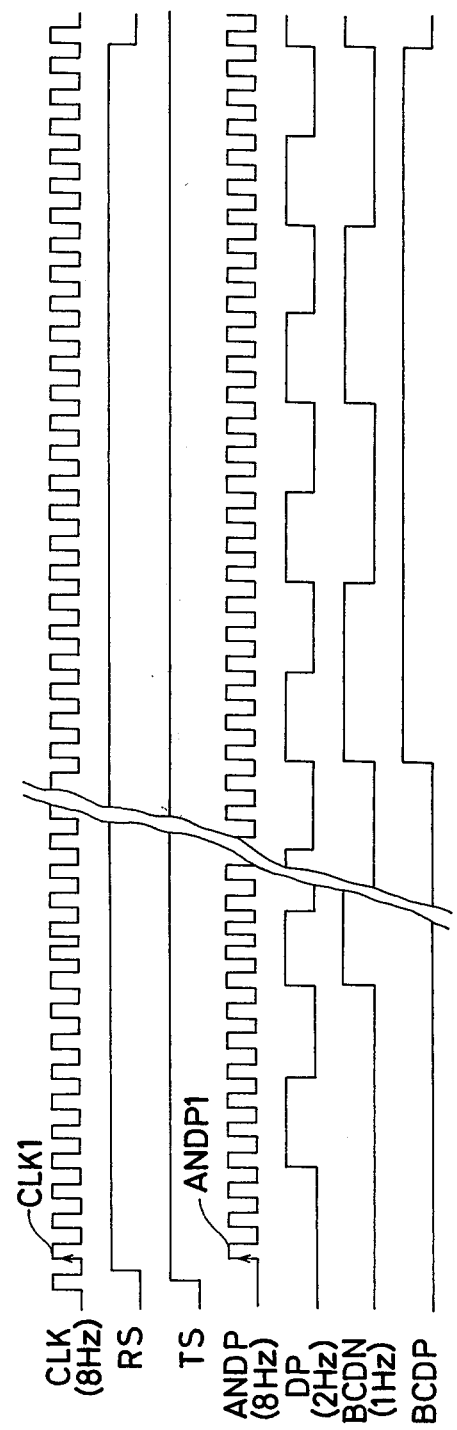
FIG. 7 is a pulse timing chart showing the manner in which the self timer of FIG. 6 may be used.

The third embodiment of the invention will next be explained by reference to FIGS. 6 and 7, with FIG. 6 showing an electrical circuit diagram of a self timer of the invention as applied to a camera, and with FIG. 7 showing various waveforms of the circuit of FIG. 6.

Referring first to FIG. 6, the self timer circuit comprises a standard pulse generator 1 which is set to produce pulses at a frequency of 8 Hz likewise as in the embodiment of FIG. 1, an AND circuit 2 having three input terminals: the first is connected to the output terminal of the generator 1, the second is connected to the release signal output terminal of the camera of FIG. 3, and the third is grounded through a switch 3 which is opened when the self timer starts, a resistor 4 connected between an electrical power source Vcc and the third input terminal of the AND circuit 2, a frequency divider consisting of three T type flip-flop circuits 5, 6 and 7, the first flip-flop circuit 5 having an input terminal T connected to the output terminal of the AND circuit 2, the second flip-flop circuit 6 having an input terminal T connected to the inversion output terminal $\overline{Q}$ of the first flip-flop circuit 5, and the third flip-flop circuit 7 having an input terminal connected to the inversion output terminal $\overline{Q}$ of the second flip-flop circuit 6, a 4-bit BDC counter 8 having an input terminal IN connected to the inversion output terminal $\overline{Q}$ of the third flip-flop circuit 7 and having a most significant bit output terminal Q4 connected to an inverter 9, an AND circuit 10 having two input terminals, one of which is connected to the output terminal of the inverter 9 and the other of which is connected to the output terminal of the AND circuit 2, an AND circuit 12 having two input terminals, one of which is connected to the inversion output terminal $\overline{Q}$ of the second flip-flop circuit 6 and the other of which is connected through an inverter 11 to the output terminal of the inverter 9, an OR circuit 13 having two input terminals connected to the respective output terminals of the AND circuits 10 and 12, and an npn transistor 15 for driving a light emitting diode 16 with a base electrode connected to the output terminal of the OR circuit 13, with an emitter electrode grounded, and with a collector electrode connected to Vcc through the light emitting diode 16 which functions as an indicating element for indicating that the self-timer is in operation as it is lighted on and off intermittently and then through a current limiting resistor 17, the parts 5 to 12 constituting an frequency converting circuit for varying the frequency of lighting on and off of the light emitting diode 16. As a control circuit for causing an exposure control operation of the camera to start when the self timer has concluded its operation, use may be made of the same circuit as that of FIG. 4.

Next, the operation of the self timer of the above described construction will be explained in connection with FIG. 7 wherein CLK shows the output pulse waveform of the generator 1, RS the output waveform of the release signal generator of FIG. 3, TS the input waveform at the input terminal of the AND circuit 2, ANDP the output pulse waveform of the AND circuit 2, DP the output pulse waveform of the flip-flop circuit 6, BCDN the input pulse waveform of the BCD counter 8, and BCDP the output pulse waveform of the output stage Q4 of the BCD counter 8.

When an exposure is to be made with the help of the self timer, the photographer will at first set a (not shown) self timer switch to open the switch 3, thereby the input terminal 2A of the AND circuit 2 is connected to Vcc through the resistor R4. The potential of the input at the input terminal 2A of the AND circuit 2 is therefore changed to "1" as shown at TS in FIG. 7.

Subsequent thereto, the shutter release button 31a of the camera is depressed to produce a release signal from the release signal generator of FIG. 3 in a timing relation as shown at RS in FIG. 7, thereby the AND circuit 2 is gated on to pass the pulses coming from the generator 1.

On the other hand, at this time, as the potential of the output at the output stage Q4 of the BCD counter 8 is "0" as shown at BCDP in FIG. 7, the potential of the input at the other input terminal of the AND circuit 10 has "1". For this reason, the AND circuit 10 permits the pulses of 8 Hz as shown at ANDP in FIG. 7 from the AND circuit 2 to be passed therethrough to the OR circuit 13 and therefrom to the transistor 15 through the resistor 14, thereby the transistor 15 is intermittently rendered conductive.

As the conduction of the transistor 15 is controlled at a frequency of 8 Hz, the light emitting diode 16 is lighted on and off at the corresponding frequency of 8 Hz with the driving current supply from Vcc, indicating that the self timer is under operation which can be viewed by persons to be photographed and the photographer. Further, the frequency of the pulses ANDP from the AND circuit 2 is divided by a factor of 2 in passing through each of the cascade connected flip-flop circuits 5, 6 and 7. In one second from the time at which the first pulse CLK1 occurs, the input terminal of the counter 8 is supplied with a first pulse BCDN. The frequency of the pulses BCDN is 1 Hz so that when the number of pulses BCDN counted by the counter 8 has reached eight, the most significant bit output terminal Q4 becomes "1" as shown at BCDP in FIG. 7, and this state is held for 2 seconds. In other words, after eight seconds from the initiation of lighting on and off of the light emitting diode 16, the output terminal Q4 of the counter 8 becomes "1".

When the output terminal Q4 of the counter 8 becomes "1" as mentioned above, the pulses ANDP applied from the AND circuit 2 to the AND circuit 10 are blocked, so that the transistor 15 is supplied with the driving pulses not from the AND circuit 10 but from the AND circuit 12, because the gating control input terminal of the AND circuit 12 takes "1" as the output pulse of the counter 8 is applied thereto through the inverter 11. Thus, the transistor 15 is rendered intermittently conductive by the pulses having a frequency of 2 Hz as shown at DP in FIG. 7 produced from the flip-flop circuit 6. Therefore, at the termination of duration of about 8 seconds from the time of initiation of operation of the self timer, the light emitting diode 16 changes its frequency of lighting on and off from 8 Hz to 2 Hz, indicating that the operation of the self timer comes near to the termination. With this indication, the persons to be photographed and the photographer can foresee that two seconds are left till the completion of operation of the self timer. At the termination of duration of 2 seconds from the time of frequency change of the light emitting diode 16, the potential at the output terminal Q4 of the counter 8 becomes again "0" so that the AND circuit 12 is gated off to pass no pulses DP from the flip-flop circuit 6. Further, the signal RS from the release signal generator takes again "0" as shown at RS in FIG. 7, because of the running down movement of the leading curtain of the shutter, thereby the AND circuit 10 is gated off to pass no signal therethrough. Therefore, in 10 seconds from the time at which the self timer starts in operation, the transistor 15 is rendered completely non-conducting, and the light emitting diode 16 is also completely turned off, informing the persons to be photographed and the photographer of the fact that the self timing operation has been completed.

As shown above, according to the present invention, the lighting on and off frequency of the light emitting diode for indication of operation of the self timer is changed to a higher or lower one at a time near the termination of duration of the self timing operation so that the persons to be photographed and photographer can foresee how much length in time is left until the operation of the self timer is concluded. At this moment, the persons to be photographed may take a posed attitude toward the camera.

What is claimed is:
1. An electrical self-timer for a camera comprising:
 (a) a single indicator which indicates duration of a self-timing operation of said self-timer;
 (b) pulse forming means for generating a pulse train having a first frequency, the pulse forming means being operatively connected to said single indicator to energize the indicator at frequency responsive to the pulse train and in synchronism with the start of the self-timing operation; and
 (c) frequency changing means connected to said pulse forming means to change the frequency of said pulse train from said first frequency to a second frequency, which is different from the first frequency, prior to the termination of the self timing operation.

2. An electrical self-timer according to claim 1, wherein said single indicator includes a light emitting diode.

3. An electrical self-timer according to claim 1, wherein said pulse forming means includes:
 (a) a standard pulse generator; and
 (b) frequency dividing means connected to the standard pulse generator for dividing the frequency of standard pulses obtained from the standard pulse generator.

4. An electrical self-timer according to claim 3, further comprising driving means which is connected to said single indicator to control energization of the indicator.

5. An electrical self-timer according to claim 4, wherein said frequency changing means is composed of a counter connected to said frequency dividing means; a first AND circuit having an input terminal receptive of said standard pulses and having an input terminal connected to a certain output terminal of said counter; a second AND circuit having an input terminal connected to a certain output terminal of said frequency dividing means and having an input terminal connected to a certain output terminal of said counter; and an OR circuit having two input terminals connected to the respective output terminals of said first and second AND circuits and having an output terminal connected to said driving means.

6. An electrical self-timer for a camera comprising:
 (a) a standard pulse generator;
 (b) a frequency dividing means connected to the standard pulse generator to divide the frequency of standard pulses obtained from the standard pulse generator;
 (c) a single indicator which indicates duration of a self-timing operation of said self-timer;
 (d) switching means having a control electrode connected to said single indicator for controlling the energization of the indicator;
 (e) first means connected to said frequency dividing means to transfer divided pulses from the frequency dividing means to the control electrode of said switching means in response to the start of said self-timing operation;
 (f) override means which overrides the action of the first means when a preset period of time has elapsed after the start of the self-timing operation; and
 (g) second means which is operatively connected to said standard pulse generator to transfer the standard pulses obtained from the standard pulse generator to the control electrode of said switching means in response to an overriding operation of said override means.

7. An electrical self-timer for a camera comprising:
 (a) a standard pulse generator;
 (b) frequency dividing means which is provided with a cascade of a plurality of flip-flop circuits connected with each other and which is connected to said standard pulse generator to divide the frequency of standard pulses obtained from the standard pulse generator;
 (c) a single indicator which indicates duration of a self-timing operation of said self-timer;
 (d) switching means having a control electrode connected to said single indicator to control the energization of the indicator;
 (e) first means connected to said frequency dividing means to transfer divided pulses from the frequency dividing means to the control electrode of said switching means in response to the start of said self-timing operation;
 (f) second means which disables said first means from performing its transferring operation a preset period of time after the start of the self-timing operation; and
 (g) third means operatively connected to said standard pulse generator to transfer standard pulses from the standard pulse generator to the control electrode of said switching means when said second means disables said first means from performing its transferring operation.

8. An electrical self-timer according to claim 7, wherein said second means includes a counter which has an input terminal connected to said frequency dividing means to count the divided pulses obtained from the frequency dividing means and which also has at least one output terminal connected to said first means to disable the first means from performing its transferring operation.

9. An electrical self-timer according to claim 7, wherein each of said flip-flop circuits consists of a T-type flip-flop.

10. An electrical self-timer according to claim 7, wherein said counter consists of a BCD counter.

11. An electrical self-timer according to claim 7, wherein said single indicator consists of a light emitting diode.

12. An electrical self-timer for a camera comprising:
(a) a standard pulse generator;
(b) frequency dividing means connected to the standard pulse generator to divide the frequency of standard pulses obtained from the pulse generator, the frequency dividing means having at least a first output stage and a second output stage to generate pulse trains of different frequencies;
(c) a single indicator which indicates duration of a self-timing operation of the self-timer;
(d) switching means having a control electrode connected to said single indicator to control the energization of the indicator;
(e) first means connected to the first stage of the output stages of said frequency dividing means to transfer divided pulses from the frequency dividing means to the control electrode of said switching means in response to the start of said self-timing operation;
(f) override means which overrides the action of said first means when a preset period of time has elapsed after the start of the self-timing operation; and
(g) second means connected to the second stage of the output stages of said frequency dividing means to transfer divided pulses from the frequency dividing means to the control electrode of said switching means in response to an overriding operation of said override means.

13. An electrical self-timer according to claim 12, wherein said single indicator is formed from a light emitting diode.

14. An electrical self-timer according to claim 12, wherein said override means includes a counter which has an input terminal connected to said frequency dividing means to count divided pulses obtained from the frequency dividing means and which has at least one output terminal operatively connected to said first means to override the transferring operation of the first means.

15. An electrical self-timer according to claim 14, wherein said counter is formed from a BCD counter.

16. An electrical self-timer for a camera comprising:
(a) a standard pulse generator;
(b) frequency dividing means connected to the standard pulse generator to divide the frequency of standard pulses obtained from the pulse generator, the frequency dividing means having at least a first output stage and second output stage to generate pulse trains of different frequencies;
(c) a single indicator which indicates duration of a self-timing operation of the self-timer;
(d) switching means having a control electrode connected to said single indicator to control the energization of the indicator;
(e) first means connected to the first stage of the output stages of said frequency dividing means to transfer divided pulses from the frequency dividing means to the control electrode of said switching means in response to the start of said self-timing operation;
(f) override means which overrides the action of said first means when a preset period of time has elapsed after the start of the self-timing operation; and
(g) second means connected to the second stage of the output stages of said frequency dividing means to transfer divided pulses from the frequency dividing means to the control electrode of said switching means in response to an overriding operation of said override means; wherein said frequency dividing means consists of a plurality of cascade connected flip-flop circuits.

17. An electrical self-timer according to claim 16, wherein each of said flip-flop circuits is formed from a T-type flip-flop.

18. An electrical self-timer for a camera comprising:
(a) a standard pulse generator;
(b) a frequency dividing means connected to the standard pulse generator to divide the frequency of standard pulses obtained from the standard pulse generator;
(c) a single indicator which indicates duration of a self-timing operation of the self-timer;
(d) switching means having a control electrode connected to said single indicator to control energization of the indicator;
(e) first means operatively connected to said standard pulse generator to transfer standard pulses from the standard pulse generator to the control electrode of said switching means in response to the start of the self-timing operation;
(f) override means which overrides the action of said first means when a preset period of time has elapsed after the start of the self-timing operation; and
(g) second means connected to said frequency dividing means to transfer divided pulses from the frequency dividing means to the control electrode of said switching means in response to an overriding operation of said override means.

* * * * *